(12) United States Patent
Jakobsson et al.

(10) Patent No.: US 7,013,295 B2
(45) Date of Patent: Mar. 14, 2006

(54) TAGGED PRIVATE INFORMATION RETRIEVAL

(75) Inventors: Bjorn Markus Jakobsson, Hoboken, NJ (US); Claus Peter Schnorr, Bad Nauheim (DE)

(73) Assignee: Lucent Technologies Inc., Murray Hill, NJ (US)

( * ) Notice: Subject to any disclaimer, the term of this patent is extended or adjusted under 35 U.S.C. 154(b) by 950 days.

(21) Appl. No.: 09/727,904

(22) Filed: Dec. 1, 2000

(65) Prior Publication Data

US 2002/0069181 A1 Jun. 6, 2002

(51) Int. Cl.
  *G06F 17/60* (2006.01)
  *H04K 1/00* (2006.01)
  *H04L 9/00* (2006.01)

(52) U.S. Cl. ............... 705/74; 705/78; 713/153; 713/154

(58) Field of Classification Search ............ 705/74, 705/78; 713/153–154
  See application file for complete search history.

(56) References Cited

U.S. PATENT DOCUMENTS

| | | | | |
|---|---|---|---|---|
| 4,759,063 A | * | 7/1988 | Chaum | 380/30 |
| 5,420,926 A | * | 5/1995 | Low et al. | 705/74 |
| 5,557,518 A | * | 9/1996 | Rosen | 705/69 |
| 5,615,269 A | * | 3/1997 | Micali | 705/80 |
| 5,629,982 A | * | 5/1997 | Micali | 380/30 |
| 5,715,314 A | * | 2/1998 | Payne et al. | 705/78 |
| 5,754,656 A | * | 5/1998 | Nishioka et al. | 705/74 |
| 6,049,613 A | | 4/2000 | Jakobsson | |
| 6,275,936 B1 | * | 8/2001 | Kyojima et al. | 713/182 |
| 6,396,928 B1 | * | 5/2002 | Zheng | 380/285 |

OTHER PUBLICATIONS

Z. A. Ramzan, "Group Blind Digital Signatures: Theory and Applications," MIT, May 1999.*
T. ElGamal, "A Public Key Cryptosystem and a Signature Scheme Based on Discrete Logarithms," IEEE Transactions on Information Theory, vol. IT-31, pp. 469-472, 1985.
C.P. Schnorr, "Efficient Signature Generation by Smart Cards," Journal of Cryptology, pp. 161-174, 1981.
M. Jakobsson, "A Practical Mix," Eurocrypt '98, LNCS 1403, pp. 448-461, 1998.

* cited by examiner

*Primary Examiner*—James P. Trammell
*Assistant Examiner*—Bradley Bayat

(57) ABSTRACT

Purchase of information items from a merchant over the Internet or other network is implemented so as to ensure that the merchant is unable to identify the particular information item(s) purchased by a user. The user when considering purchase of a given information item is permitted to access a corresponding signed ciphertext of that item. The signed ciphertext in an illustrative embodiment includes a first ciphertext portion in the form of a symmetric key encrypted using a public key associated with the merchant, a second ciphertext portion corresponding to the information item encrypted using the symmetric key, an unencrypted description of the information item, and a tag corresponding to a signature. The user requests purchase of the information item by sending a blinded version of the first ciphertext portion to a payment server along with an appropriate payment. The payment server decrypts the blinded version of the first ciphertext portion and returns the resulting symmetric key to the user. The user then utilizes the symmetric key to decrypt the second ciphertext portion so as to obtain the desired information item. The decrypting operation performed by the payment server may be implemented using at least part of a set of multiple rounds, with the user providing a blinded ciphertext and receiving a corresponding decryption result for each of the rounds.

17 Claims, 3 Drawing Sheets

TAGGED PRIVATE INFORMATION RETRIEVAL

FIELD OF THE INVENTION

The invention relates generally to techniques for retrieving information over the Internet or other communication networks, and more particularly to retrieval techniques which are configured to protect the privacy of an associated retrieving user.

BACKGROUND OF THE INVENTION

Privacy is an important aspect of digital commerce. However, privacy requirements are often difficult to satisfy when combined with other important properties, such as fair and correct charging for information downloaded or otherwise retrieved over the Internet or other type of network. In order for a merchant to be able to charge a customer or other user correctly for such retrieved information, it generally must know that the user has obtained information exactly corresponding to a particular requested payment. However, in many situations a user may prefer that no one, not even the merchant, know exactly what information he or she is buying. Existing techniques for private information retrieval have been unable to provide an adequate solution to this problem in an efficient manner. Moreover, such techniques have generally been unable to hide from the merchant the particular purchase price associated with a given retrieved information item. This type of approach fails to provide adequate protection of user privacy in that the type of information purchased can often be inferred from the purchase price.

A wide variety of cryptographic techniques are also known in the art. Such techniques include public key cryptography and digital signatures. One well-known type of public key cryptography is based on ElGamal encryption using discrete logarithms, and is described in T. ElGamal, "A Public Key Cryptosystem and a Signature Scheme Based on Discrete Logarithms," IEEE Transactions on Information Theory, Vol. 31, pp. 469–472, 1985, which is incorporated by reference herein. A well-known type of digital signature referred to as a Schnorr signature is described in C. P. Schnorr, "Efficient Signature Generation for Smart Cards," Journal of Cryptology 4, pp. 161–174, 1981, which is incorporated by reference herein. It is also known that a signed ElGamal encryption of a message can be generated as an ElGamal ciphertext together with a Schnorr signature of that ciphertext, with the public signature key given by the ElGamal ciphertext. This signed ElGamal encryption is described in greater detail in M. Jakobsson, "A Practical Mix," Enurocrypt '98, LNCS 1403, pp. 448–461, 1998, and in U.S. Pat. No. 6,049,613 issued Apr. 11, 2000 and entitled "Method and Apparatus for Encrypting, Decrypting and Providing Privacy for Data Values," both of which are incorporated by reference herein.

Although these and other cryptographic techniques are known in the art, such techniques have not heretofore been applied to private information retrieval in a manner which solves the above-noted problem of preventing a merchant from determining the particular information items purchased by a given user.

SUMMARY OF THE INVENTION

The invention solves the above-noted problem of the prior art by providing techniques for tagged private information retrieval. In accordance with one aspect of the invention, purchase of information items from a merchant over the Internet or other network is implemented so as to ensure that the merchant is unable to identify the particular information item(s) purchased by a user.

An illustrative embodiment of the invention is configured such that a user when considering purchase of a given information item is permitted to access a corresponding signed ciphertext of that item. The signed ciphertext in the illustrative embodiment includes a first ciphertext portion in the form of a symmetric key encrypted using a public key associated with the merchant, a second ciphertext portion corresponding to the information item encrypted using the symmetric key, an unencrypted description of the information item, and a tag which includes a signature. The user requests purchase of the information item by sending a blinded version of the first ciphertext portion to a payment server along with an appropriate payment. The payment server decrypts the blinded version of the first ciphertext portion and returns the resulting symmetric key to the user. The user then utilizes the symmetric key to decrypt the second ciphertext portion so as to obtain the desired information item.

In accordance with another aspect of the invention, the decrypting operation performed by the payment server may be implemented in at least part of a set of multiple rounds, with the user providing the payment server with a blinded ciphertext and receiving in response a corresponding decryption result for each of the rounds. For example, the decrypting operation may be implemented in j rounds, such that for each of the first j−1 of the rounds the user provides a blinded ciphertext to the payment server and receives in response a corresponding decryption result. A plaintext generated by the payment server after the jth round and supplied to the user may then provide a decryption key or other information that is utilized by the user in conjunction with accessing the given information item. Alternatively, a plaintext generated after one of the first j−1 rounds may provide the decryption key or other information that is utilized by the user in conjunction with accessing the given information item. The payment server is unable to determine which of these arrangements is being utilized at any given time, since it is decrypting blinded ciphertext.

The invention provides a number of advantages over the conventional techniques described previously. For example, the tagged private information retrieval of the invention can ensure that no one other than the user is able to determine what particular information item has been purchased, and that no electronic or paper "trail" is created. In addition, if a given purchased information item does not correspond to its associated description, the user may show a transcript of the decryption process to the merchant or a designated third party in order to complain, and potentially get a refund. The invention thus allows complaints to be made in case a merchant advertises one type of information item but actually sells another type of information item to the customer. The tagged private information retrieval of the invention can also be configured such that the payment server knows only the total amount charged but does not know whether this charge corresponds to one sale at the total amount, or to multiple sales at lesser amounts. Advantageously, the invention hides from the payment server and merchant the price paid by the user for particular information items. The payment server and merchant will only know that the user paid the appropriate amount for the information items.

DETAILED DESCRIPTION OF THE INVENTION

The present invention will be illustrated below in conjunction with an exemplary system in which the tagged private information retrieval techniques of the invention are implemented over the Internet or other type of network or communication channel. It should be understood, however, that the invention is more generally applicable to any type of electronic system or device application in which it is desirable to provide privacy for information retrieval. For example, although well-suited for use with computer communications over the Internet or other computer networks, the invention can also be applied to numerous other information retrieval applications, including applications involving information retrieval over wireless networks using wireless devices such as mobile telephones or personal digital assistants (PDAs).

Figure 1:
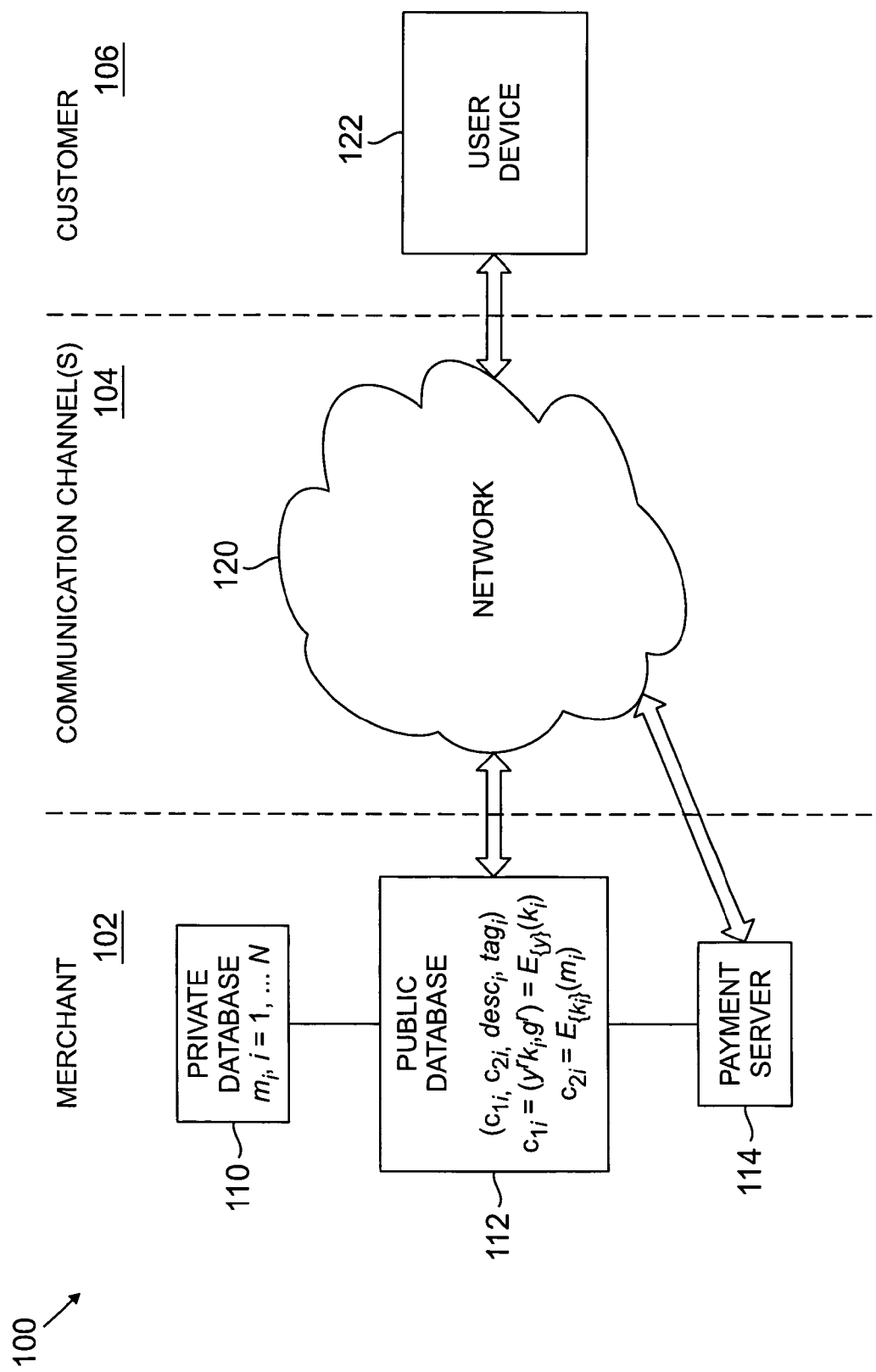
FIG. 1 shows an illustrative embodiment of an information retrieval system configured to provide tagged private information retrieval in accordance with the invention.

FIG. 1 shows an exemplary system 100 in which tagged private information retrieval techniques are implemented in accordance with the invention. In the system 100, a merchant 102 communicates over one or more communication channels 104 with a customer 106. A set of elements including a private database 110, a public database 112, and a payment server 114 is associated with the merchant 102. The one or more communication channels 104 in this illustrative embodiment comprise a network 120. A user device 122 is associated with the customer 106. The customer 106 is more generally referred to herein as a user. The term "user" as used herein should be understood to include the customer 106 or a processing device such as user device 122 associated with that customer. Operations referred to herein as being performed by or in conjunction with a user may therefore be performed by or in conjunction with user device 122.

Although the payment server 114 is associated with the merchant 102 in the system 100, this is not a requirement of the invention, and the payment server 114 may be a third party entity separate from the merchant 102 in other embodiments of the invention.

The network 120 may be a local area network, a metropolitan area network, a wide area network, a global data communications network such as the Internet, a private "intranet" network or any other suitable data communication medium, as well as portions or combinations of such networks or other communication media. For example, elements 112 and 122 may be connected by one network, while elements 114 and 112 are connected by another network. Numerous other interconnection arrangements may also be used.

The user device 122 may be a desktop or portable personal computer, a mobile telephone, PDA, a television set-top box or any other type of device capable of retrieving information over network 120.

It should be understood that although only a single merchant 102 and customer 106 are shown in the FIG. 1 embodiment, the invention is more generally applicable to any number, type and arrangement of different merchants and users.

The private database 110 associated with the merchant 102 includes a number of entries each corresponding to a particular retrievable information item $m_i$, i=1, 2, ... N. These are plaintext information items, i.e., are in an unencrypted form. The information itself may be audio, video, image, data or any other type of information as well as combinations thereof. The term "retrievable information item" as used herein is thus intended to include any type of information in any form retrievable over a network or other communication channel.

The public database 112 in the illustrative embodiment includes for each information item $m_i$, a corresponding entry which comprises a signed ElGamal ciphertext of the form $(c_{1i}, c_{2i}, desc_i, tag_i)$. Each of the elements of the ith signed ElGamal ciphertext entry will be described in detail below.

Element $c_{1i}$ is an ElGamal encryption of a random symmetric key $k_t$, where $k_t$ is an element of a strong cyclic group G of prime order q with generator g, and may be generated using techniques that are well known in the art. The ElGamal encryption $c_{1i}$, of the key $k_t$ is generated as follows:

$$c_{1i} = (y^r k_t, g^r) = E_{\{y\}}(k_t),$$

for r chosen uniformly at random from $Z_q$, where $Z_q$ is the field of integers modulo q, and where y is the public key of the merchant 102. As will be apparent to those skilled in the art, $k_t$ is an element of the group G generated by g, and may otherwise be converted into a format required for the second encryption operation described below, using well-known techniques. Associated with the public key y is a secret key x that is used for decryption of the encrypted key $k_t$, as will be described below. This secret key x is known to the payment server 114 associated with merchant 102 but unknown to the customer 106.

Element $C_{2i}$ is an encryption of the corresponding information item $m_i$, and is generated using the key $k_t$, that is, $$c_{2i} = E_{\{k_t\}}(m_i),$$

This encryption may be performed using a symmetric cipher, such as the Rijndael cipher recently selected for use as the Advanced Encryption Standard (AES). Additional details regarding the Rijndael cipher can be found at, e.g., http://www.esat.kuleuven.ac.be/~rijmen/rijndael/, and http://csrc.nist.gov/encryption/aes. Other types of known encryption techniques may also be used. In addition, the encryption used to generate $c_{2i}$ may be based on an appropriate function of the key $k_t$, rather than the key itself, as will be apparent to those skilled in the art.

The element $desc_t$ is a description of the corresponding information item $m_i$. This description will generally contain information about the retrievable information item, such as an abstract if the item is an article, or a thumbnail sketch if the item is an image or video. The description $desc_t$ will also preferably contain pricing information, which may be in the form of a sales contract or other type of pricing policy specifying the charge given different constraints, such as previous purchases, subscription information, etc.

The element $tag_t$ in the illustrative embodiment is a Schnorr signature on $(c_{1i}, c_{2i}, desc_t)$ generated using $g^r$, i.e., the second portion of the ElGamal encryption $c_{1i}$ described above, as a public key and r as a secret key. Note that r is a temporary secret key and is used for this particular element $tag_t$ only. Additional details regarding Schnorr signatures can be found in the above-cited reference C. P. Schnorr, "Efficient Signature Generation for Smart Cards," Journal of Cryptology 4, pp. 161–174, 1981.

Figure 2:
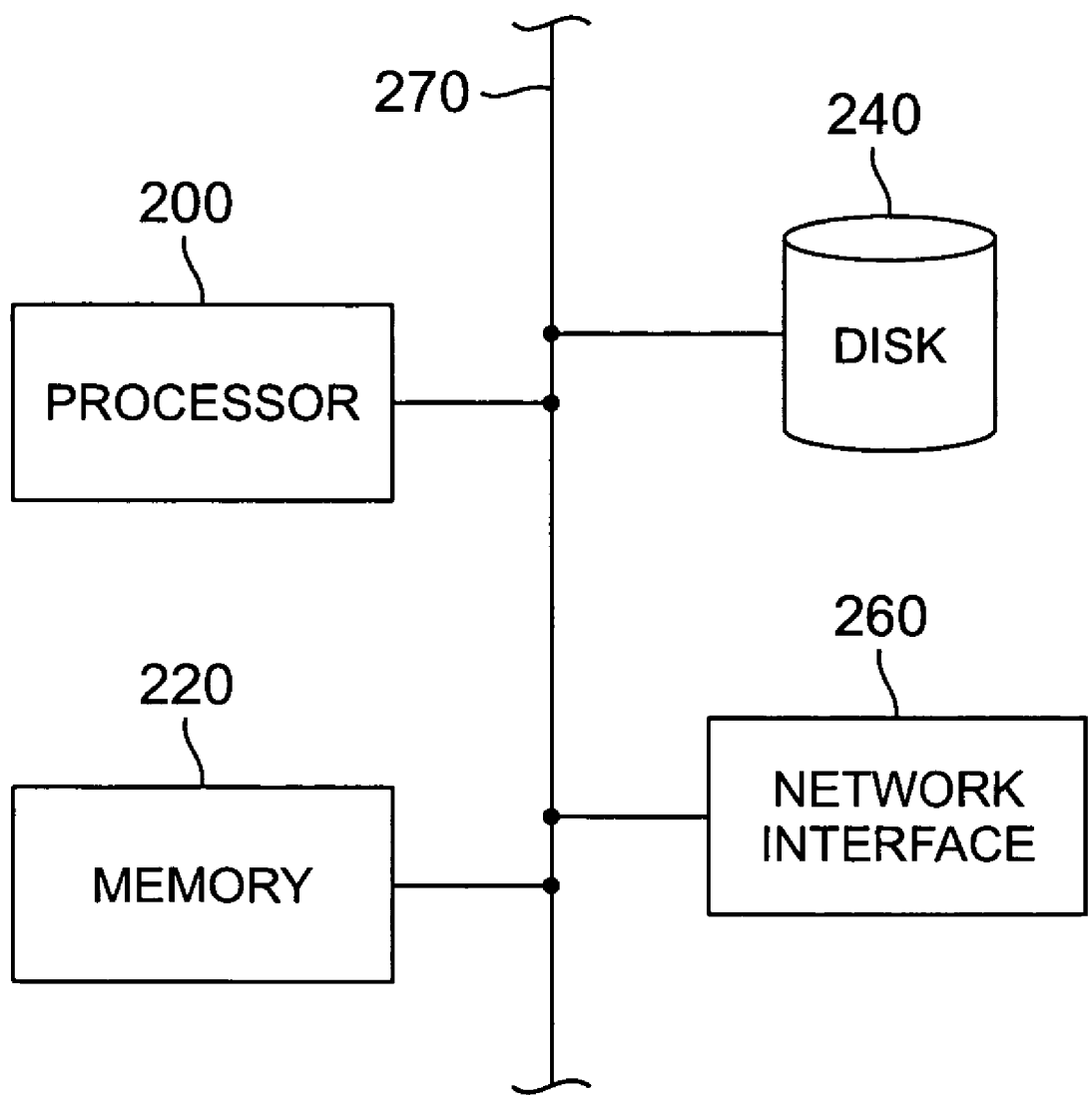
FIG. 2 is a block diagram of one possible implementation of a given one of the elements of the system of FIG. 1.

FIG. 2 shows one possible implementation of a given one of the processing elements of system 100. The implementation in FIG. 2 may represent one or more of the elements 110, 112 and 114 associated with the merchant 102, or the user device 122 associated with customer 106, as well as portions of these elements. In this example implementation, the element of system 100 includes a processor 200, an electronic memory 220, a disk-based memory 240, and a network interface 260, all of which communicate over a bus 270. One or more of the processing elements of system 100 may thus be implemented as a personal computer, a mainframe computer, a computer workstation, a smart card in conjunction with a card reader, or any other type of digital data processor as well as various portions or combinations thereof. The processor 200 may represent a microprocessor, a central processing unit, a digital signal processor, an application-specific integrated circuit (ASIC), or other suitable processing circuitry. It should be emphasized that the implementation shown in FIG. 2 is simplified for clarity of illustration, and may include additional elements not shown in the figure. In addition, other arrangements of processing elements may be used to implement one or more of the elements of the system 100.

The elements 102 and 106 of system 100 execute software programs in accordance with the invention in order to provide tagged private information retrieval in a manner to be described in detail below. The invention may be embodied in whole or in part in one or more software programs stored in one or more of the element memories, or in one or more programs stored on other machine-readable media associated with the elements of the system 100.

Figure 3:
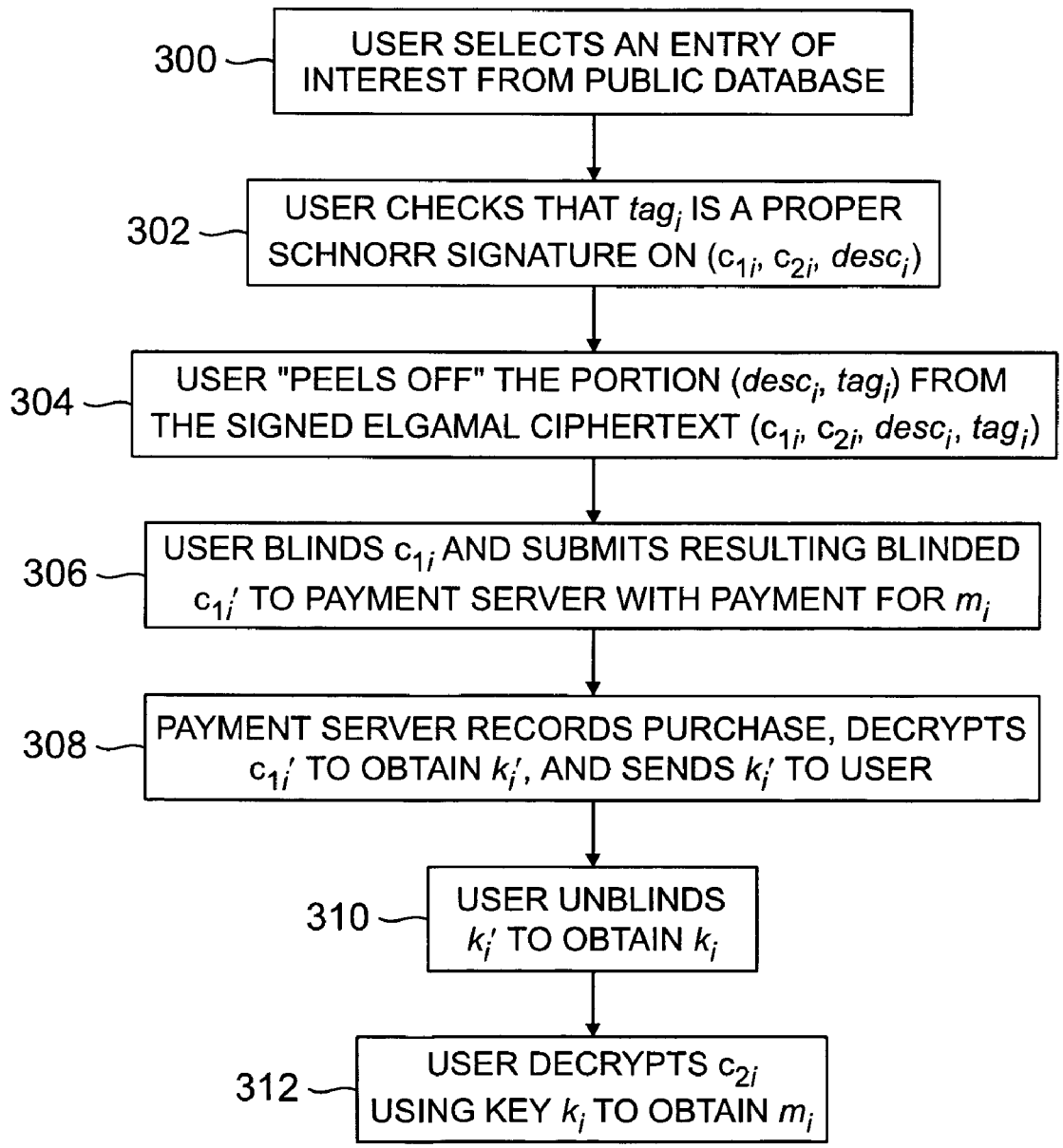
FIG. 3 is a flow diagram of an example tagged private information retrieval process in accordance with the invention.

FIG. 3 is a flow diagram illustrating an example tagged information retrieval process implemented in the system 100 of FIG. 1 in accordance with the invention. It is initially assumed for this example that the cost of each retrievable information item $m_t$ is the same, i.e., a fixed charge c, although this is not a requirement of the invention, and embodiments in which this assumption does not apply will be described in more detail below.

In step 300 of FIG. 3, a user selects an entry of interest from the public database 112. As noted above, the complete signed ElGamal ciphertext entry in public database 112 for information item $m_t$ is of the form ($c_{1t}$, $c_{2t}$, $desc_t$, $tag_t$). The user corresponds in this example to customer 106, and establishes a connection with the public database 112 via user device 122 and network 120 in a conventional manner, e.g., in accordance with the well-known Internet protocol. The selection in step 300 may be made through interaction with one or more web pages associated with public database 112, using a browser or other similar program implemented on the user device 122. It is assumed for illustration purposes only that the user in step 300 selects from the public database 112 a single entry corresponding to information item $m_t$.

Verification and decryption of the signed ElGamal ciphertext may be performed by the user in the manner indicated in step 302–312 of FIG. 3. In step 302, the user checks that $tag_t$ is a proper Schnorr signature on ($c_{1t}$, $c_{2t}$, $desc_t$). In step 304, the user removes or "peels off" the portion ($desc_t$, $tag_t$) from the signed ElGamal ciphertext. The user then blinds $c_{1t}$ and submits the resulting blinded ciphertext $c_{1t}'$ to the payment server 114 for decryption, along with an appropriate payment for the information item $m_t$, as indicated in step 306.

In the illustrative embodiment, in which an ElGamal ciphertext is signed using a Schnorr signature, the blinding may be implemented as follows. As previously noted, the ElGamal ciphertext $c_{1t}$ of the symmetric key $k_t$ is given by ($y^r k_t$, $g^r$) for random $r \in Z_q$, where $Z_q$ is the field of integers modulo q. The user blinds this ElGamal ciphertext $c_{1t}$ by picking a random $u \in G$ and a random $s \in Z_q$, where as previously noted G is a strong cyclic group of prime order q with generator g, and then generating the blinded ciphertext $c_{1t}'$ as ($y^{r+s} u k_t$, $g^{r+s}$). The invention can also be implemented using other types of blinding.

The payment server in step 308 records the purchase, decrypts the blinded ciphertext $c_{1t}'$ using the secret key x in order to obtain a blinded key $k_t'$ and sends the blinded key $k_t'$, to the user. The user in step 310 receives the blinded key $k_t'$ from the payment server, and unblinds it by multiplication with $u^{-1}$ to obtain the key $k_t$. The user in step 312 utilizes the key $k_t$ to decrypt the ciphertext $c_{2t}$, thereby obtaining the desired information item $m_t$.

The above-described blinding is an important feature of the invention, since it allows the sale of the information item $m_t$ in a private manner, i.e., without anyone other than the user, i.e., customer 106, learning what information was sold, and without the possibility of any electronic or paper "trail" being created. More particularly, the payment server 114 and the merchant 102 do not know and cannot determine what retrievable information item the user has purchased. The invention thus provides strong protection of user privacy for purchase of retrievable information items over the Internet or other type of network.

If the information item $m_t$ generated in step 312 does not correspond to $desc_t$, the user may show a transcript of the above decryption process to the merchant or a designated third party in order to complain, and potentially get a refund. This is another important feature of the invention, as it allows complaints to be made in case a merchant advertises one type of information but attempts selling another piece of information.

As noted previously, the user does not know the secret decryption key x corresponding to the public encryption key y. The payment server 114 associated with the merchant 102 therefore performs the decryption of the blinded ciphertext $c_{1t}'$ as indicated in step 308. The payment server receives the blinded ciphertext $c_{n1t}'$ along with a request for the information item $m_t$ and an appropriate payment as indicated in step 306. The payment server will thus charge the user for the information item $m_t$ in return for providing the blinded key $k_t'$ obtained by decryption of the blinded ciphertext $c_{1t}'$. It is also possible for the payment server to include, along with its transmission of the blinded key $k_t'$ to the user, a proof of correct decryption, as will be readily apparent to those skilled in the art. Such a proof allows the user to check decrypted information received from the payment server for correctness, and can facilitate generation of a complaint if the result of the decryption of the ciphertext $C_{2t}$ is not what was described in $desc_t$.

Although illustrated in the case of a single selected retrievable information item $m_t$, it will be apparent to those skilled in the art that the process of FIG. 3 can be extended in a straightforward manner to operate with multiple selected retrievable information items. For example, steps 302–312 can be repeated serially or in parallel in order to allow the process to accommodate multiple selected items.

As noted above, it is possible for the merchant 102 to impose different prices or pricing policies for different retrievable information items. The present invention permits such an arrangement without allowing the identity of the purchased items to be inferred from the purchase price.

One example of an embodiment of the invention which allows different prices for different information items is as follows. As described previously, the embodiment illustrated in conjunction with FIG. 3 uses a particular public key y which corresponds to a fixed charge c. In order to charge an amount j*c, the merchant may instead use a public key $y_j$ for which the secret key is given by $x_j = x^j$ mod q. For example, the public key $y_j$ may be as follows:

$$y_j = g^{\{x^j\}} \bmod p.$$

The decryption performed by the payment server in step 308 of FIG. 3 can then be done in one round using the key $x_j$, or in j rounds using the key x for each round. If the latter approach is utilized, the user may reblind the partial decryption result for each round, and may also substitute that result with another ciphertext key to be decrypted. The payment server will never know which of these occurred, since both would be blinded. Therefore, the payment server knows the total amount charged (j*c) but does not know whether this corresponds to one sale at the total amount, or to j sales of c each, or to something in between. This is yet another important feature of the present invention, since it hides from the payment server and merchant the price paid by the user for particular information items. It should also be noted that if an anonymous payment scheme is used, and the payments are independent, then the payment server will also not know whether it is interacting with one user or more than one user at any given time, and thus cannot separate the processing operations for different users.

As another example of an embodiment of the invention which allows different prices for different information items, the merchant 102 may establish different public keys for different prices. In such an embodiment, the merchant may establish one public key $y_1$ for one price, and another public key $y_2$ for a second price. Since the payment server 114 with necessity will know what secret key it uses for decryption, it will also know what the charge should be. If subscriptions are used to determine charges, the user may present subscription information instead of or along with his or her payment.

The present invention in the illustrative embodiments described herein preferably uses ElGamal encrypted ciphertext signed using Schnorr signatures. However, other types of encryption and signature techniques could also be used. Examples of such techniques are described in A. J. Menezes et al., "Handbook of Applied Cryptography," CRC Press, 1997, which is incorporated by reference herein.

It should be understood that the above-described embodiments of the invention are illustrative only. For example, the invention can be applied to any type of information retrieval system and corresponding arrangement of user or merchant devices, and different encryption and signature techniques may be used. Furthermore, the particular process utilized in a given embodiment may vary depending upon factors such as the pricing policies used, the number of items selected, the use of subscriptions or anonymous pricing policies, etc. These and numerous other alternative embodiments within the scope of the following claims will be apparent to those skilled in the art.

What is claimed is:

1. A method for controlling access to one or more information items purchasable from a merchant and accessible over a network, wherein a user interested in a given information item is permitted to access a corresponding signed ciphertext of the given information item, the signed ciphertext having at least a first ciphertext portion, the method comprising the steps of receiving from the user a blinded version of the first ciphertext portion of the signed ciphertext in conjunction with a request from the user for purchase of the given information item from the merchant; and decrypting the blinded version of the first ciphertext portion and returning to the user the resulting decrypted blinded version of the first ciphertext portion, wherein the resulting decrypted blinded version provides information that is utilized by the user in conjunction with accessing the given information item in a manner such that the merchant is unable to identify the given information item purchased by the user.

2. The method of claim 1 wherein the signed ciphertext for the given information item comprises the first ciphertext portion, a second ciphertext portion, an unencrypted description of the information item, and a tag, with at least a portion of the tag comprising a signature.

3. The method of claim 2 wherein the signature utilizes at least a part of the first ciphertext portion as a public key.

4. The method of claim 1 wherein the first ciphertext portion comprises a symmetric key encrypted using a public key associated with the merchant.

5. The method of claim 1 wherein the first ciphertext portion is encrypted using an ElGamal encryption technique.

6. The method of claim 1 wherein the signed ciphertext is signed using a Schnorr signature.

7. The method of claim 1 wherein the signed ciphertext further includes a second ciphertext portion corresponding to an encrypted version of the given information item.

8. The method of claim 1 wherein the user verifies a signature of the signed ciphertext before requesting purchase of the given information item.

9. The method of claim 1 wherein the decrypting step is implemented in a payment server associated with the merchant.

10. The method of claim 1 wherein the decrypted blinded version of the first ciphertext portion returned to the user further comprises a proof of correct decryption that allows the user to check that the decrypted blinded version for correctness.

11. The method of claim 1 wherein the decrypted blinded version of the first ciphertext portion returned to the user comprises a blinded key that when unblinded by the user is used to decrypt a second ciphertext portion of the signed ciphertext so as to obtain the purchased information item.

12. The method of claim 1 wherein the decrypting step is implemented in at least part of a set of multiple rounds, with the user providing a blinded ciphertext and receiving a corresponding decryption result for each of the rounds.

13. The method of claim 12 wherein the decrypting step is implemented mi rounds, and wherein for each of the first j−1 of the rounds the user provides a blinded ciphertext and receives in response a corresponding decryption result that is subsequently reblinded by the user and provided as the blinded ciphertext for the next round, and wherein a plaintext generated after the jth round provides the information that is utilized by the user in conjunction with accessing the given information item.

14. The method of claim 12 wherein the decrypting step is implemented in part of a set of fj rounds, and wherein for each of the first j−1 of the rounds the user provides a blinded ciphertext and receives in response a corresponding decryption result, and wherein a plaintext generated after one of the first j−1 rounds provides the information that is utilized by the user in conjunction with accessing the given information item.

15. The method of claim 1 wherein the merchant establishes different public keys for use with different ones of a plurality of information items purchasable from the merchant.

16. A processor-based system for controlling access to one or more information items purchasable from a merchant and accessible over a network, wherein a user interested in a given information item is permitted to access a signed ciphertext version of the given information item, the signed ciphertext version having at least a first ciphertext portion, and wherein the system is operative: (i) to receive from the user a blinded version of the first ciphertext portion of the signed ciphertext in conjunction with a request from the user for purchase of the given information item from the merchant; and (ii) to decrypt the blinded version of the first ciphertext portion and return to the user the resulting blinded version of the first ciphertext portion, wherein the resulting blinded version provides information that is utilized by the user in conjunction with accessing the given information item in a manner such that the merchant is unable to identify the given information item purchased by the user.

17. A machine-readable medium containing one or more software programs for controlling access to one or more information items purchasable from a merchant and accessible over a network, wherein a user interested in a given information item is permitted to access a corresponding signed ciphertext having at least a first ciphertext portion, and wherein the one or more programs when executed implement the steps of: receiving from the user a blinded version of the first ciphertext portion of the signed ciphertext in conjunction with a request from the user for purchase of the given information item from the merchant; and decrypting the blinded version of the first ciphertext portion and returning to the user the resulting blinded version of the first ciphertext portion, wherein the resulting blinded version provides information that is utilized by the user in conjunction with accessing the given information item in a manner such that the merchant is unable to identify the given information item purchased by the user.

* * * * *

UNITED STATES PATENT AND TRADEMARK OFFICE
CERTIFICATE OF CORRECTION

PATENT NO.    : 7,013,295 B2
DATED         : March 14, 2006
INVENTOR(S)   : B.M. Jakobsson et al.

It is certified that error appears in the above-identified patent and that said Letters Patent is hereby corrected as shown below:

Column 8,
Line 55, delete "mi" and insert -- in j --.
Line 64, delete "ofj" and insert -- of j --.

Signed and Sealed this

Ninth Day of May, 2006

JON W. DUDAS
*Director of the United States Patent and Trademark Office*